United States Patent [19]

Fournier

[11] 4,114,852
[45] Sep. 19, 1978

[54] MINIATURE REED-TYPE VALVE

[76] Inventor: Yves J. Fournier, 49 Thornberry Rd., Winchester, Mass. 01890

[21] Appl. No.: 798,797

[22] Filed: May 20, 1977

[51] Int. Cl.² ............................................. F16K 31/06
[52] U.S. Cl. ..................................... 251/138; 251/139
[58] Field of Search ................ 251/129, 138, 139, 141

[56] References Cited
U.S. PATENT DOCUMENTS

| 2,920,254 | 1/1960 | Ray | 251/138 |
|---|---|---|---|
| 3,120,943 | 2/1964 | Donelan | 251/141 |
| 3,246,662 | 4/1966 | Shebanow | 251/141 |
| 3,621,864 | 11/1971 | Tonegawa | 251/129 |

Primary Examiner—Martin P. Schwadron
Assistant Examiner—A. Michael Chambers
Attorney, Agent, or Firm—James E. Mrose

[57] ABSTRACT

An on-off valving mechanism, which is normally stably self-biased to one operating condition and which is magnetically actuable to display the opposite condition, is in the form of a slender elongated generally-cylindrical cartridge having a laterally-offset longitudinal opening running from one cylindrical end to a laterally-recessed section where it merges with a transverse passage terminating in a minute valve seat projecting slightly above the surface of that recessed section; a small disk-like valve member is movable laterally into and out of engagement with the seat by an elongated flat spring member of magnetic material anchored at one end to the other end of the cartridge and having its free end disposed for lateral movements between two stops, one of which is also of magnetic material. The cylindrical end of the cartridge is sealed within a non-magnetic tube, such that its valve seat becomes the sole port between upstream and downstream ends of the tube, and excitation of an electromagnet surrounding the tube and cartridge sets up longitudinal lines of magnetic flux which draw the spring member into engagement with the stop of magnetic material.

14 Claims, 6 Drawing Figures

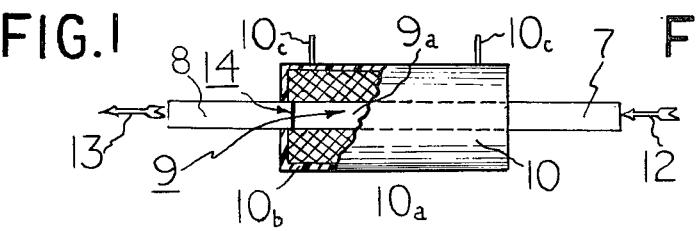
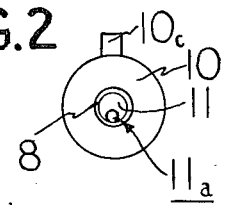
FIG. 1   FIG. 2
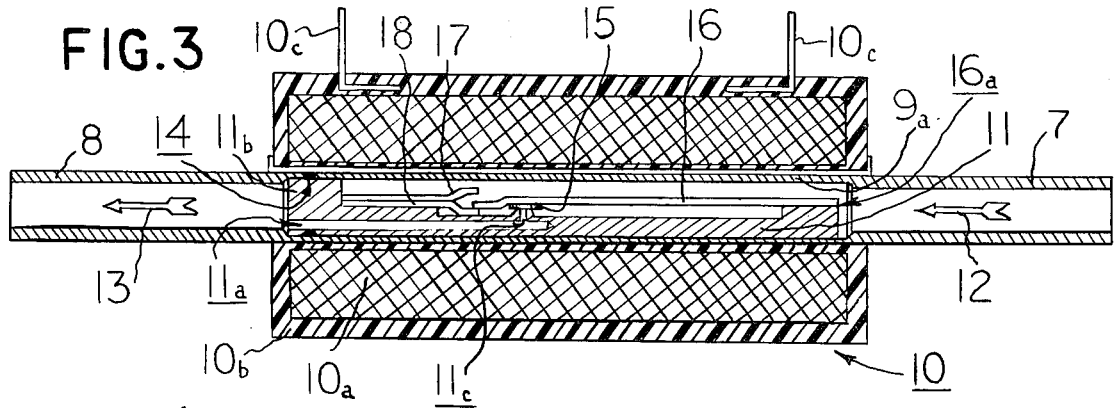
FIG. 3
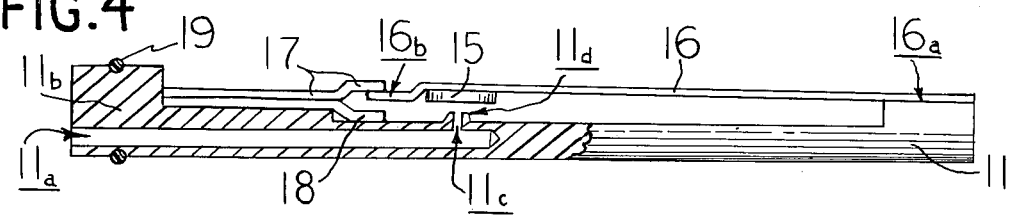
FIG. 4
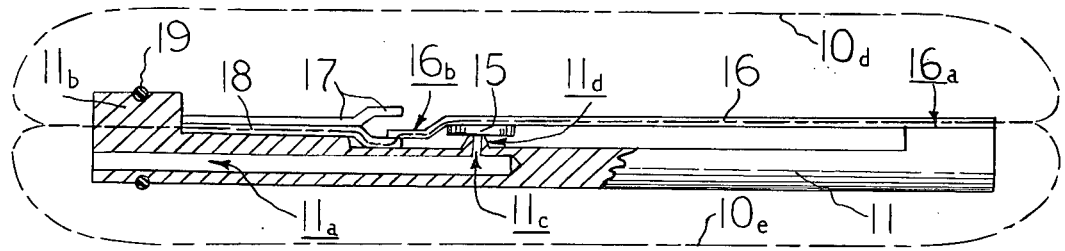
FIG. 5
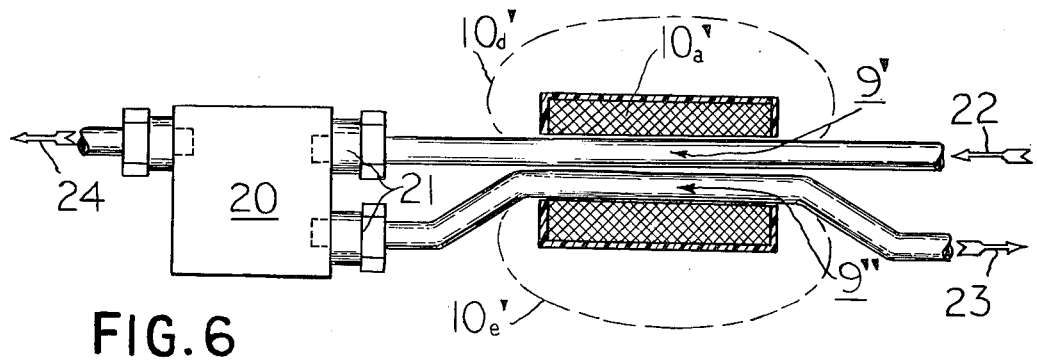
FIG. 6

MINIATURE REED-TYPE VALVE

BACKGROUND OF THE INVENTION

The present invention relates to improvements in valving of fluids, and, in one particular aspect, to a novel and improved magnetically-actuated valve of low-cost, miniaturized, uncomplicated and reliable construction in which the armature moving a small valving member is of elongated reed-like form exploiting both spring and magnetic characteristics and cooperates with a simple tube and rod-like frame to produce a complete valving assembly which may be actuated electromagnetically with very little power.

Fluid valves are known in a wide variety of sizes and types; those with which this invention is concerned involve magnetic or electromagnetic actuations such as may be realized using solenoids, and are particularly useful in pilot-type valving applications. When located at remote sites, or when used in automated systems, valves are commonly actuated or adjusted by control equipment including electric motors or solenoids. The electrical power demands for such equipment tend to be very substantial when the valves represent significant loads, and it then requires quite costly and complicated intermediate electrical apparatus to control such valves in response to low-power outputs from computers or other control-signal sources. In some situations, where intrinsic safety is to be achieved, a dangerous area such as one involving explosive gases cannot be jeopardized by the presence of high-power electrical supply lines, and it is not permissible to operate valves requiring significant electrical actuating power in those areas; similarly, in medical environments involving oxygen and combustible anaesthetic fluids, only very low levels of electrical signals, which are not likely to ignite or detonate, can be tolerated in supply of operating power for valves. Pilot valves, which may be of relatively low flow capacity and which function mainly to preserve or relieve pressures, can be used in association with or as "pilots" for larger valves which use the pressures of the valved fluids to control their own operation; in such instances, the pilot valves may need only relatively little electrical power to drive them while their larger associates in fact develop relatively large amounts of mechanical valving power from their fluid pressures.

Improved and unique reed-type valves which are in accord with the present invention are especially well suited to applications of the pilot-valve type last referred to, inasmuch as they require only relatively small actuating power. The latter factor also renders such valves highly useful in environments which must remain intrinsically safe, and, further, they may be directly interfaced with certain computers, sensors or other devices capable of yielding electrical outputs of only low power. Toward those ends, the movable valving members of my valves are actuated by a reed-like member which is of magnetic material and is disposed to close a small gap with another magnetic material member when both are in a path of magnetic flux from a nearby coil or other source. Reed-type electrical switches having some similar characteristics have been known heretofore and have operated at low power levels; however, in those prior devices, to my knowledge, there has been no fluid valving and it has been sought to have electrical contacting take place in a fully closed or sealed environment. Arrayed in conformity with my teachings, a reed, valve member, and seat and passage member can form a simple and minute cartridge which may be inserted into and sealed with a small nonmagnetic tube for controlled reliable valving of the tube as determined by a magnetic field impressed from outside.

SUMMARY

A preferred miniature reed-type valve in accordance with the present invention comprises a slender nonmagnetic body member of generally cylindrical and rod-like outline which has been modified to substantially hemicylindrical shape except at one end. A laterally-offset small longitudinal bore from said one end merges with a transverse bore to produce a continuous passageway extending from that one end to a valve seat disposed at the site of the hemicylindrical section. With the cylindrical outline from which material was removed to yield the hemicylindrical section, there is disposed an elongated reed or blade of magnetic spring material, anchored at one end to the opposite end of the body member, and a bifurcated stop assembly secured nearer the said one end of the body member but with its two spaced ends of magnetic and nonmagnetic material, respectively, disposed for stopping actions which limit travel of the free end of the reed member. A small elastomeric lift-valve member of flat disk form is secured to one side of the reed member, in position to effect closure of the seat when the reed is flexed toward one stop and to lift from the seat and open the passageway when the reed is flexed toward the other stop. Depending upon whether the valve is to be normally open or normally closed, the reed member, which serves as a spring, may be normally self-biased toward one or the other stop, but the opposite stop is then selected to be the one which is fabricated of magnetic material. The miniature cartridge-like assembly as thus far described must be associated with another valve body member, and with a magnetic field source, to complete a typical overall assemblage. Very conveniently, the second valve body member is a plain non-magnetic tube, into which the cartridge is inserted and to which the cylindrical end of the cartridge is sealed, by an O-ring or other gasket, or by a welding or other bonding operation. In turn, an electrical coil is mated in surrounding relation to that part of the tube wherein the cartridge is located, and, upon excitation of the coil to cause a magnetic flux to align itself longitudinally of the tube, the magnetic reed flexes into engagement with the magnetic stop in its induced effort to provide as low a reluctance path as possible for flow of the magnetic flux. At the same time, the attached valve disk is moved in relation to the seat, after the fashion of lift valving, and the ends of the tube on opposite sides of the cartridge thereby experience the desired opening or closure for the intended valving purposes.

Accordingly, it is one of the objects of the present invention to provide novel and improved fluid valving of uncomplicated and low-cost construction which operates reliably with high sensitivity, which resists adverse effects of vibration and shock, which is capable of operating rapidly and without involving large volumes of fluid, which utilizes but few parts in non-wearing relationships promoting long service life, and which lends itself to convenient fabrication in highly miniaturized form.

Another object is to provide an advantageously simple and rugged miniature valve which may be actuated electromagnetically with little power as an intrinsically-safe device, involving a reed-type lift-valve support of magnetic material cooperating with a slender rod-like body member to form major components of a sub-assembly cartridge lending itself to ready combination with a tube and electromagnet which complete the body and provide for actuations.

BRIEF DESCRIPTION OF THE DRAWINGS

Although the aspects and features of this invention which are believed to be novel are expressed in the appended claims, further details as to preferred practices and as to the further objects and features thereof may be most readily comprehended through reference to the following description of preferred embodiments taken in connection with the accompanying drawings, wherein:

FIG. 1 is a side view, with portions broken away, of a fullsize miniature reed-type valve and an associated electromagnet actuator;

FIG. 2 illustrates the same valve and actuator from the left end shown in FIG. 1;

FIG. 3 is a longitudinally cross-sectioned view of the same valve and actuator, on a much-enlarged scale which better exposes features of the interior valving mechanisms;

FIG. 4 provides a partly cross-sectioned enlargement of a reed-type valving mechanism, separate from any enclosure, in a normally-open condition, and with an elastomeric seal;

FIG. 5 provides a view of the same mechanism shown in FIG. 4, in a closed condition; and FIG. 6 illustrates a three-way valve arrangement utilizing two of the valves of the present invention in cooperation with a single electromagnet and a common manifold.

DESCRIPTION OF THE PREFERRED EMBODIMENTS

The valving arrangement appearing in FIGS. 1 and 2 is portrayed on a typical miniaturized full-size scale, and it will be observed that its tubular inlet, 7, and outlet, 8, conduits are on opposite sides of an intermediate valving portion, 9, which exhibits only the same small external diameter as the inlet and outlet, such that, except for a surrounding actuating coil, 10, the unit displays the external configuration of a simple tube (e.g., 3/16 inch tubing). However, as is discussed later herein, the valving portion 9 has a nonmagnetic tubing, 9a, which functions as part of the body of an in-line valve, and there is another body member, 11, inside tubing 9a and exhibiting a laterally-offset port or passage 11a (FIG. 2). The actuating coil or spool, 10, which includes a simple annular solenoid winding 10a molded within an insulating plastic casing 10b, is fitted closely about valving portion 9 and has electrical terminals 10c to which electrical excitation may be applied from an appropriate source when a normally-open version of the valve is to be closed or when a normally-closed version of the valve is to be opened. Conventional tube fittings or couplings (not shown) may be connected to the inlet and outlet ends 7 and 8, or, alternatively, other common connection techniques may be employed to couple the valve so that its inlet porting is to a source of high pressure, indicated by arrow 12, and so that its outlet porting is to a downstream site of low pressure, indicated by arrow 13.

The inner valving elements are shown in the FIG. 3 enlargement of the same valving arrangement, and still further enlargements of a similar cartridge-type sub-assembly appear in FIGS. 4 and 5, where the same reference characters are used for the same components. Second body member 11 is fashioned in the illustrated slender and elongated form, one end, 11b, having essentially the same cross-sectional outline as that of the inside of tube 9a (i.e., cylindrical), so that it mates closely within that tube. The two body parts, 9a and 11, are sealed together by a weld 14, or the like, such that fluid and pressure communications between the inlet and outlet, 7 and 8, can occur only through a valved passageway. That passageway is formed by the laterally-offset longitudinal passage, 11a, which extends into body part 11 for a limited distance from the downstream end 11b, and by a short transverse passage 11c which is formed normal to and intersects with passage 11a. The cross-section of slender body member 11 is reduced to a substantially hemicylindrical form upstream of end 11b, such that further valving elements may be accommodated there, within the same small cylindrical outline corresponding to the inside of tubular body part 9a. A valve seat, 11d (FIGS. 4 and 5), preferably of minute annular form, is formed at the upstream end of passage 11c, where it is raised slightly above the flat surface 11d of the hemicylindrical section of body part 11. As is also shown more clearly in FIGS. 4 and 5, a small lift-valve member, 15, which is preferably of an elastomeric material, is disposed to move into and out of closing relationship to valve seat 11d, the passageway formed by intersecting passages 11a and 11c being open in FIG. 4 and closed by the valve member 15 in FIG. 5. The stem or support for movable valve member 15 is a thin flat elongated blade or reed 16 of material which has both spring characteristics and low magnetic reluctance (i.e., is of good magnetic material); examples of suitable materials are an alloy of 50% iron and 50% nickel, and an alloy of 49% iron, 49% cobalt and 2% vanadium. One end of blade 16 is anchored, at 16a, to the reduced-section end of body part 11, as by a welding or other suitable bonding operation, and the valve member is bonded to the underside of the blade near its free end and in alignment with the valve seat 11d located at a near-middle position intermediate the ends of the body part 11.

The said free end, 16b, of blade 16 is trapped between two stops, 17 and 18, which are conveniently the separate ends of a bifurcated or yoke assembly composed of strips of nonmagnetic and magnetic material fixed with the body part 11. In the example shown in FIGS. 4 and 5, where the valve is normally open (FIG. 4), the upper strip and stop 17 is nonmagnetic, and the lower strip and stop 18 is of magnetic material, preferably like that of blade 16. The spacing between stop ends 17 and 18 need only be large enough to accommodate upward lifting and downward seating motions which are adequate to positively open and close the disk 15 and seat 11d. However, in the normally open condition of the valve (FIG. 4), the spring blade 16 exerts an upward force or bias which causes its free end 16b to engage nonmagnetic stop 17 firmly, thereby tending to prevent the blade and valve disk from undergoing unwanted movements as the result of expected levels of ambient vibration or the like. Nevertheless, when a suitable external magnetic field is applied, forcing lines of magnetic flux to extend axially or longitudinally of the assembly, the blade is to be drawn downwardly and to press the valve disk 15 against the seat 11d, to close the valve passageway. The needed magnetic flux is readily generated upon electrical excitation of the winding 10a (FIG. 3), and a suitable pattern thereof is suggested by the double-dashed linework 10d and 10e (FIG. 5). That flux pattern is one wherein magnetic lines of flux extend centrally and longitudinally in relation to the elongated valve unit, and such flux therefore tends to crowd into and through the only two pieces of magnetic material which are present, namely the blade or reed 16 and the stop member 18. As is characteristic of such magnetic-material members in substantial alignment but with a small lateral gap between them, they tend to close that gap by drawing together. In the assembly under consideration, the only member free to move is the reed 16, and its end 16b therefore leaves stop 17 (FIG. 4) and immediately deflects toward the magnetic-material stop 18, carrying valve disk 15 into closing relationship to valve seat 11d (FIG. 5), wherever the appropriate magnetic field is impressed. All other major masses of material in the assemblage, such as the body part 11. surrounding tubular body member 9a, and the other stop member 17, are of nonmagnetic material, to prevent interference with the valve actuation as described. Valve disk 15 leaves seat 11d, and the valve opens just as soon as electrical excitation of the field-producing winding is interrupted, due to the spring bias of blade or reed 16 which tends to deflect it upwardly against nonmagnetic stop 17.

The normally-open valving arrangement may instead be made to have a normally-closed characteristic; for that purpose, the bias of spring reed 16 is in the downward direction, such that valve disk 15 is normally held in closing relation to seat 11d, and the positions of the magnetic and nonmagnetic stops are reversed, with the lower stop, 18, being made of nonmagnetic material and the upper stop, 17, being of the magnetic material. Excitation of the associated electromagnet winding then generates a longitudinal field whose flux lines tend to crowd through the magnetic reed 16 and magnetic upper stop 17, thereby closing the gap between stop 17 and reed end 16b and, at the same time, lifting valve member 15 from seat 11d to open the valve passageway. In the latter type of unit, the nonmagnetic lower stop 18 may not be needed at all, since its mechanical stopping function may be served by a surface of the valve body 11.

As has already been referred to herein, the miniaturized reed-type valve may be designed to require very little electrical exciting power for its winding. By way of example, a unit such as that of FIG. 3 can be operated satisfactorily with only about 180 milliwatts of power, and it can therefore be made to serve as an intrinsically-safe electrically-operated device in an area where hazards prevent the use of high voltages and currents. However, it is also possible to operate such reed-type valves with windings that do not encircle the body tube thereof, so long as the resulting magnetic field flux lines tend to pass substantially longitudinally in relation to the elongated valve structure. Further, such valves may be actuated in accordance with appropriate nearby movements of a permanent magnet, the field flux lines of which travel generally in the longitudinal relation to the elongated valve structure.

Although the unit shown in FIGS. 1-3 involves a welding of the inner valve body part 11 to the surrounding tubular body structure, a desired sealing and holding may instead be achieved by a suitable gasket, such as the O-ring type elastomeric element 19 illustrated in FIGS. 4 and 5. That sub-assembly "cartridge" unit need only be pushed into a nonmagnetic tube offering but slight clearance to form a valve arrangement suitable for actuation by a magnet or electromagnet, and such as push-in cartridge is itself marketable per se for valving uses by the customer.

Two or more of the improved reed-type valves may be disposed closely parallel to one another for simultaneous responses to the magnetic field produced by a winding encircling them in common. FIG. 6 illustrates such an array, involving two valves 9' and 9" encircled by one winding 10a', serving as a three-way valve in combination with a common manifold 20. That same arrangement depicts the use of conventional tube fittings 21 in association with the valved tubes. A supply of high pressure is represented by arrow 22, an exhaust to low pressure by arrow 23, and a coupling to a suitable load by arrow 24; the valves 9' and 9" may be either normally open or normally closed, and are of construction like that shown in FIGS. 3, 4 and 5. Flux lines 10d and 10e are doubly-dashed counterparts of the linework appearing in FIG. 5. It will of course be understood that certain economies in power and components are readily realized by grouping together with one actuating winding those valves which are to be actuated simultaneously in a given system. The inner body part 11 is conveniently formed by appropriate machining of cylindrical bar stock of nonmagnetic material, although in some instances it may be preferred to mold it or to fabricate it or its equivalent from several pieces. For many applications, such as pilot-valving of a larger pressure-actuated valve, the amount of fluid flow which must be accommodated need be only small, and the flow passageway, valve seat and valve member need only be of small cross-sectional area as well; however, larger flows can take place in scaled-up versions of the valve, or in alternative structures wherein the reed carries more than one valve member or a valve member shaped to seat over a relatively large area. High speeds of operation are attained more readily when only low volumes of flow are involved. Lift-type valving is preferred because it can be used effectively with fluids which are not very clean, and that is an advantage over prior spool-type valves, for example. Many of the same advantages can be realized when the long-life unit, involving no critical wearing parts, is modified so that the spring blade carries a small mass of magnetic material, rather than itself being of such material, and it is also possible to repel or attract such a mass, or a mass having a magnetization of its own, to achieve desired movements of a valving member in a slender elongated assembly like that which has been shown and described.

Accordingly, it should be understood that the specific practices and preferred embodiments herein referred to have been offered by way of disclosure rather than limitation, and that various modifications, additions and substitutions may be effected by those skilled in the art without departure from these teachings; it is therefore aimed in the appended claims to embrace all such variations as fall within the true spirit and scope of this invention.

What I claim as new and deisire to secure by Letters Patent of the United States is:

1. A fluid valve arrangement comprising a hollow member of nonmagnetic material having upstream and downstream portions which are to be valved in relation to one another, a body including nonmagnetic material fitted within said hollow member and sealed with the interior thereof about its outer periphery at a position therealong, said body having a valve seat and a passageway extending therethrough from one side of said position to said valve seat on the opposite side of said position, a valve member, flexible means supporting said valve member on said body for movements between two limits at which said valve member is in seated closing engagement with said valve seat and is out of said engagement and opens said seat, respectively, mechanical stop means fixed with said body and flexible means and disposed for mechanical engagement which limits said movements when said valve member opens said seat, said flexible means normally resiliently urging said valve member to and holding said valve member at one of said limits, said flexible means having material operatively associated therewith which interacts magnetically with magnetic field flux impressed from outside said hollow member to force said valve member to the other of said limits, and means outside said hollow member for impressing said magnetic field flux and thereby actuating said valve arrangement.

2. A fluid valve arrangement as set forth in claim 1 wherein said hollow member comprises cylindrical tubing, wherein said body has a cylindrical outer periphery at said position, wherein said flexible means comprises an elongated spring member anchored to said body at one end, wherein the end of said spring member opposite said one end is disposed for engagement with said stop means, and wherein said elongated spring member extends substantially longitudinally in relation to said cylindrical tubing and supports said valve member for said movements in directions substantially normal to the direction of elongation of said spring member.

3. A fluid valve arrangement as set forth in claim 2 wherein said valve member comprises a valve disk, wherein said valve seat has an annular rim disposed for engagement with said disk, and wherein said disk and rim are in planes substantially normal to said direction of elongation.

4. A fluid valve arrangement as set forth in claim 2 wherein said material operatively associated with said spring member is magnetic material extending substantially longitudinally in relation to said tubing and movable in said directions with said spring member, wherein said stop means includes a stop member of magnetic material disposed for interaction which attracts said magnetic material operatively associated with said spring member to hold said valve member at the other of said limits when magnetic field flux impressed from outside tends to travel in paths including all of said magnetic material, and wherein said means for impressing said field flux directs said flux to travel in said paths.

5. A fluid valve arrangement as set forth in claim 4 wherein said spring member is itself of said magnetic material, wherein said stop member is elongated and extends substantially longitudinally in relation to said tubing and is oriented to have one end thereof engaged by said opposite end of said spring means when the gap between them is closed by said interaction, and wherein said means for impressing said field flux directs said flux substantially longitudinally in relation to said tubing.

6. A fluid valve arrangement as set forth in claim 5 wherein said stop means includes a further stop member, of nonmagnetic material, having an end spaced from said one end of said stop member of magnetic material in direction normal to said direction of elongation, wherein said opposite end of said spring member is disposed for movements between the spaced ends of said stop members, and wherein said means for impressing said field flux comprises an electromagnet having winding turns annularly about the exterior of said tubing.

7. A fluid valve arrangement as set forth in claim 6 wherein said valve member comprises a valve disk of elastomeric material, wherein said valve seat has an annular rim disposed for engagement with said disk, wherein said disk and rim are in planes substantially normal to said direction of elongation, and wherein said valve disk is disposed upstream in relation to said valve seat, such that upstream pressures tend to maintain closure of said disk against said seat.

8. A fluid valve arrangement as set forth in claim 2 further comprising a compressible gasket fitted about said cylindrical outer periphery of said body and making a fluid-tight seal between said outer periphery and the inner periphery of said cylindrical tubing.

9. A fluid valve sub-assembly adapted to be fitted within a nonmagnetic tubular member to valve upstream and downstream portions of the tubular member in relation to one another, comprising an elongated body including nonmagnetic material one end of which has a cross-section of outline adapting it to fit closely within the tubular member, said body having reduced cross-sectional dimensions elsewhere than at said one end, said body having a passageway extending therethrough from said one end to a valve seat disposed laterally of the reduced cross-sectional portion of said body, a valve member, an elongated spring member having one end anchored to said body at an end thereof and having said valve member fixed therewith at a distance from the anchored end and in position for lateral movements therewith between two limits at which said valve member is in seated closing engagement with said seat and is out of said engagement and opens said seat, respectively, and mechanical stop means fixed with said body and disposed for mechanical engagements with the opposite end of said spring member to establish said limits of said movements, said spring member normally resiliently urging said valve member to and holding said valve member at one of said limits, said spring member having material operatively associated therewith which interacts magnetically with magnetic field flux impressed from outside the tubular member to force said valve member to the other of said limits and means outside said hollow member for impressing said magnetic flux and thereby actuating said valve arrangement.

10. A fluid valve sub-assembly as set forth in claim 9 wherein said spring member is of magnetic material and extends substantially longitudinally in relation to said body and is deflectable laterally, wherein said stop means includes an elongated stop member of magnetic material disposed substantially longitudinally in relation to said body with one end in an overlapping relation to the opposite end of said spring member which effects a mechanical stopping, whereby magnetic field flux impressed substantially longitudinally of said body from outside acts to close any gap between said stop member and said opposite end of said spring member and thereby forces said valve member to the other of said limits.

11. A fluid valve sub-assembly as set forth in claim 10 wherein said stop means includes a further stop member, of nonmagnetic material, having an end spaced laterally from said one end of said stop member of magnetic material, and wherein said opposite end of said spring member is disposed for movements between the spaced ends of said stop members.

12. A fluid valve sub-assembly as set forth in claim 10 wherein said body outline is substantially cylindrical, wherein said valve member comprises a valve disk of elastomeric material, wherein said spring member is of substantially flat blade form, and further comprising a compressible gasket fitted around the cylindrical outer periphery of said body for fluid-tight sealing of said body with the cylindrical interior of a tubular member which is to be valved.

13. A fluid valve sub-assembly as set forth in claim 12 wherein said valve seat has a rim disposed for engagement with said disk which is substantially annular and projects laterally above nearby surfaces of the reduced cross-sectional portion of said body, and wherein said passageway is formed by intersecting blind holes extending longitudinally and transversely of said body.

14. A fluid valve sub-assembly as set forth in claim 13 wherein said body is substantially cylindrical at said one end and of substantially hemicylindrical outline elsewhere, and wherein said spring member and stop members and valve disk are disposed within an extension of the cylindrical outline of said one end, and wherein said cylindrical outline of said sub-assembly has a small diameter of the order to 3/16 inch.

* * * * *